United States Patent [19]

Ohya et al.

[11] Patent Number: 5,411,773
[45] Date of Patent: May 2, 1995

[54] FRICTION MATERIAL

[75] Inventors: Kazuyuki Ohya; Shunichi Shinohara, both of Tokyo, Japan

[73] Assignee: Mitsubishi Gas Chemical Company, Inc., Tokyo, Japan

[21] Appl. No.: 160,200

[22] Filed: Dec. 2, 1993

[30] Foreign Application Priority Data

Dec. 9, 1992 [JP] Japan .................................. 4-329377

[51] Int. Cl.6 ................................................ C09K 3/14
[52] U.S. Cl. .......................................... 428/1; 51/298; 188/251 A
[58] Field of Search .............................. 428/1; 51/298; 188/251 A Primary Examiner—Alexander S. Thomas
Attorney, Agent, or Firm—Roylance, Abrams, Berdo & Goodman

[57] ABSTRACT

An asbestos-free friction material with improved water resistance which is used in automobiles, vehicles, and industrial machinery is disclosed. The friction material comprises a fibrous reinforcing substrate other than asbestos, a binder and a friction wear regulator, the fibrous reinforcing substrate partly containing a fibrillated pulp of an aromatic liquid crystal polyester resin.

6 Claims, No Drawings

FRICTION MATERIAL

FIELD OF THE INVENTION

This invention relates to an asbestos-free friction material for use as a disk pad, a brake lining or a clutch facing in automobiles, vehicles, and industrial machinery. More particularly, the invention relates to the friction material with improved water resistance.

BACKGROUND OF THE INVENTION

So far, friction materials comprising asbestos as a reinforcing substrate and a phenolic resin as a binding resin (binder) have been used for a number of applications, because of their excellent cost performance. However, asbestos was found to be carcinogenic, and asbestos-containing friction materials naturally discharge asbestos, which has posed the problem of environmental pollution.

Therefore, it has been studied to use, in place of asbestos, any suitable combinations of materials more expensive than asbestos, such as glass fibers, rock wool, steel fibers, brass fibers, aramide fibers, hard carbon, and calcined coke. For example, a friction material comprising steel fibers and wholly aromatic polyamide fibers (Japanese Laid-Open Patent Publication No. Sho 56-88433), and a friction material comprising glass fibers (Japanese Laid-Open Patent Publication No. Sho 51-87549) are available.

Initially, friction materials containing glass fibers or steel fibers as a reinforcing substrate were developed. For example, Japanese Laid-Open Patent Publication No. Sho 48-16972 proposes a method of producing a clutch facing using glass fibers. Glass fibers are linear and suitable as a roving for a clutch facing. However, they are unsatisfactory in terms of opposite-surface wearing properties and friction coefficient. Compared with asbestos, moreover, they are poor in preform retaining properties and may easily collapse. Thus, they are problematical in productivity, and their use is becoming rare. Inorganic fibers including glass fibers, if they are very thin fibers of several microns or less in diameter, may be carcinogenic like asbestos. Hence, it is difficult for such very thin fibers to maintain productivity comparable to that of asbestos.

A semimetallic disk brake pad containing steel fibers as a reinforcing substrate has been found to present a noticeable squeal of the brake, rusting, high heat conductivity, and other drawbacks.

Fibers or a fibrillated pulp of an aramide resin, one of wholly aromatic polyamides, on the other hand, are or is a reinforcing substrate with excellent wear resistance and free from the above-described defects, such as opposite-surface attacking properties and a brake squeal. The fibrillated pulp also has the advantage that it has excellent properties of retaining the shape of a preform in a widely used method for the production of a friction material which comprises producing the preform under pressure, laying the preform on a base plate having an adhesive layer formed thereon, and molding the assembly with heating under pressure for integration. The fibrillated pulp, however, has high water absorption, and is poor in affinity for a phenolic resin or a bismaleimide triazine resin. Upon rapid heating, it may blister due to steam, thereby causing the friction material to peel off. Owing to these problems, its amount usable is limited, thus resulting in insufficient strength. In producing the friction material, drying is an indispensable step for attaining a predetermined proportion of the fibrillated pulp. Moreover, the aramide fibers have the disadvantage that when they are cut, they tend to be fluffed on the cut surfaces.

SUMMARY OF THE INVENTION

The object of the present invention is to seek a fibrous reinforcing substrate free from the above-mentioned problems of friction materials, especially the drawbacks of fibrillated pulp of an aramide resin, and provide a satisfactory friction material with a high water resistance, a high affinity for a binder, and excellent processability.

Specifically, the present invention is a friction material comprising an organic and/or inorganic fibrous reinforcing substrate other than asbestos, a binder and a friction wear regulator, the organic fibrous reinforcing substrate consisting essentially of a fibrillated pulp of an aromatic liquid crystal polyester resin, the fibrillated pulp having a melting point of 330° C. or higher.

DESCRIPTION OF THE PREFERRED EMBODIMENTS:

The fibrillated pulp of the present invention is of a shape in which numerous branch fibers with a diameter of 0.1 to 10 μm are branched from trunk fibers with a diameter of 5 to 50 μm. The fibrillated pulp also includes that of a shape in which a plurality of the trunk fibers are coupled together via the numerous branch fibers. The length of the trunk fibers is preferably 0.5 to 5 mm. Substantially straight fibers with no or few branches are unsuitable, because they lack the properties of retaining the shape of the preform during the production process for the friction material. In preferred embodiments of the present invention, the friction material is one in which the fibrillated pulp of the aromatic liquid crystal polyester resin has a melting start temperature raised by heat treatment, or has a melting start temperature of 330° C. or higher, or is rendered infusible. The amount of the fibrillated pulp used is 70 wt. % or more, preferably 100%, of the organic fibrous reinforcing substrate. The fibrillated pulp of the aromatic liquid crystal polyester resin may be used jointly with other organic fibrous reinforcing substrate materials. However, the fibrillated pulp of aramide fibers, for instance, is not preferred if used in a large amount, because of its hygroscopicity and processability. The fibrillated pulp of cellulose is also undesirable in terms of hygroscopicity and heat resistance.

The construction of the present invention will be described below.

The aromatic liquid crystal polyester resin is a thermoplastic polymer forming an anisotropic melt layer, and is generally classified as a thermotropic liquid crystal polymer. In molten condition, this polymer is oriented by a shearing force. If a means of crushing is selected, the polymer can be converted into a fibrillated pulp by a crushing treatment with the occurrence of powdery matter being inhibited.

The aromatic liquid crystal polyester resin is produced by polycondensing a combination mainly of an aromatic dicarboxylic acid, an aromatic diol, an aromatic hydroxycarboxylic acid, etc., and if desired with the use of an alicyclic dicarboxylic acid, and an alicyclic or aliphatic diol. Generally, the weight-average molecular weight of the polymer is in the range of from 2,000 to 200,000, and its melting start temperature (the transition temperature for transition from a solid into a liquid crystal state) as determined by a differential scanning calorimeter (DSC) is 250° C. or higher. In the present invention, the one with a weight-average molecular weight of 15,000 or more is preferred, and that with a melting start temperature by DSC of 330° C. or higher is preferred.

Examples of the aromatic liquid crystal polyester resin include Xydar SRT-300 (Amoco Performance Products Inc.) and Vectra A-950 (Hoechst Celanese Corp.). They also include aromatic liquid crystal polyester resins containing bonds other than ester linkage, such as polyester imides as described in Japanese Laid-Open Patent Publication No. Hei 3-91534, and polyester amides as described in Japanese Laid-Open Patent Publication Nos. Sho 57-177019 and Sho 57-177020.

In the present invention, moreover, the aromatic liquid crystal polyester resin with a melting start temperature (according to DSC) raised by heat treatment using a catalyst, or the aromatic liquid crystal polyester resin which has been rendered infusible can be used more preferably. The heat treatment is performed at a temperature 0°–30° C. lower than the melting start temperature to raise the melting start temperature, or if desired, while raising the heat treating temperature in correspondence with the raised melting start temperature. This heat treatment may be carried out in a multi-step manner in which the heat treating temperature is continuously raised in response to the rise in the melting start temperature. From the aspects of the molecular weight increase as well as monomer removal, the heat treatment should preferably be performed under reduced pressure. When the fibrillated pulp is to be prepared by crushing or grinding, heat treatment of pellets before crushing is preferred because of easy handling. It is recommendable to confirm beforehand that any aromatic liquid crystal polyester resin to be used can be converted into a fibrillated pulp.

An example of the multi-step heat treatment is as follows:

1. Heating is performed for 0.5 to several hours at a temperature 0°–30° C. lower than the melting start temperature, thereby raising the melting start temperature by 5°–30° C.
2. Heat treatment is performed similarly with the heat treating temperature being raised to a temperature nearly corresponding to the raised melting start temperature in Step 1.
3. A procedure in which heat treatment is performed with the heat treating temperature being raised to a temperature nearly corresponding to the raised melting start temperature is repeated if desired.

The heat treatment produces the following effects:

1. The melting start temperature is raised, and heat resistance improved.
2. The molecular weight is increased.
3. The monomer, oligomer, etc. are removed by volatilization, polymerization or the like.

The effect of removing the monomer, oligomer, etc. indicated in 3, in particular, is to decrease the hydroxyl group or carboxyl group. This is preferred since it can inhibit an excessive reaction of the thermosetting resin used as the binder.

The infusibility of the aromatic liquid crystal polyester resin may occur upon the above-described heat treatment alone, but it is accomplished by performing the above heat treatment, if desired, with the use of a catalyst, thereby raising the degree of polymerization markedly, and promoting the growth of crystals, or introducing a crosslinking structure between the molecules. For example, a homopolymer of p-hydroxybenzoic acid is rendered infusible by raising the degree of polymerization. Japanese Laid-Open Patent Publication No. Hei 1-207358 describes a method of obtaining an infusible resin by joint use of a catalyst. A method of making an aromatic liquid crystal polyester infusible by blending therewith pitch having a hydrogen atom/carbon atom ratio of from 0.4 to 0.9, and heat-treating the resulting composition has also been found. This method can be used preferably. In this method, the amount of the pitch blended is preferably 2 to 10% by weight. An amount of less than 2% by weight is not preferred, because a long time is required until infusibility is achieved. An amount in excess of 10% by weight will result in an insufficient strength. The infusible aromatic liquid crystal polyester does not show a fusion-associated heat absorption peak by DSC, and when burnt, carbonizes without fusing.

A fibrillated pulp of the infusible aromatic liquid crystal polyester is preferred, because it minimizes the formation of a tarry substance which will otherwise occur as a result of decomposition during the postcuring of the friction material.

The fibrillated pulp of the present invention is normally produced by grinding or crushing pellets by a wet mill, a dry crusher using an air stream, or the like. Alternatively, it may be produced by melt-spinning pellets into fibers, and then converting them into a fibrillated pulp. In the case of crushing or grinding, a wet mill is preferred. Actually, 1 mm$\phi$ or smaller pellets of the aromatic liquid crystal polyester resin, or ordinary pellets (1 mm or larger) of this resin coarsely crushed to a diameter of 1 mm or less are charged into a mill together with water. After milling, a fibrillated pulp mixture in the form of a slurry is dehydrated by a centrifuge, and then dried.

The present invention is characterized by using the above-mentioned fibrillated pulp of the aromatic liquid crystal polyester resin as part of the fibrous reinforcing substrate. A binder (binder composition), other fibrous reinforcing substrates other than asbestos, and a friction wear regulator may be conventional ones.

Examples of the binder or binder composition include compositions comprising phenolic resins, cyanate ester resins (U.S. Pat. No. 4,944,373), and others for friction materials for a brake; resins for a clutch facing, such as NBRs, melamine modified phenolic resins; cyanate ester resins incorporating polycyclic aromatic pitch; phenol modified aromatic hydrocarbon formaldehyde resin novolak-epoxy resins; and phenol modified aromatic hydrocarbon formaldehyde resin novolak-epoxy resin/cyanate ester resin. In the case of a brake pad required to withstand a high load, cyanate ester resins are preferred. Curing catalysts, mold releasing agent, etc. may be incorporated if desired.

The fibrous reinforcing substrate other than asbestos includes, for example, inorganic or metallic fibers. Specific examples include steel fibers, steel fibers having an $Fe_3O_4$ film formed on the surface, copper or copper alloy fibers, copper fibers having a CuO film formed on the surface, carbon fibers with a final calcination temperature of 1,100° C. or lower, rock wool fibers, ceramic fibers, and potassium titanate fibers. Normally, two or more of these fibers are used in combination. It is preferred that rock wool fibers, steel fibers, copper fibers, or carbon fibers with a final calcination temperature of 1,100° C. or lower (one not completely graphitized) are used as a main component. Among glass fibers and potassium titanate fibers are those with a diameter of the order of submicrons or less, but they are not preferred as are asbestos fibers.

Any of these fibrous reinforcing substrates is used, if desired, after surface treatment with the cyanate ester resin for use as a component of the binder composition. Alternatively, any of them can be used preferably after undergoing a treatment for making a more stable surface, as in steel fibers having an $Fe_3O_4$ film formed on the surface, or copper fibers having a CuO film formed on the surface.

Examples of the friction wear regulator include barium sulfate, graphite, calcium carbonate, molybdenum disulfide, calcium fluoride, powder of cured resin such as BT resin dust, alumina, silica, mullite, powders or chips of metals such as copper, brass, bronze, iron, zinc and tin, and metal oxides such as copper oxide, antimony trioxide, zirconium oxide and ferric oxide. These materials are selected in any suitable combinations for providing functions, such as stabilization of friction coefficients at low to high temperatures, imparting of wear resistance, prevention of fade at high temperatures, and cleaning of the disk surface.

The BT resin dust is obtained by curing a mixture of phenol modified aromatic hydrocarbon formaldehyde resin novolak-epoxy resin and BT resin, the phenol modified aromatic hydrocarbon formaldehyde resin novolak-epoxy resin being prepared by epoxidizing a phenol modified aromatic hydrocarbon formaldehyde resin novolak formed by reacting aromatic hydrocarbon formaldehyde resin with phenol; and then crushing the resulting cured product.

The friction material of the present invention is produced using the above-described components.

The methods for production generally comprise preparing a composition for the friction material by uniformly mixing the components using a blender, an Eirich mixer, a Banbury mixer, a Lödige mixer (Plowshare type), a Henschel mixer or any other suitable means, charging the composition into a mold or the like of a desired Shape, preforming the charge, and molding the preform with heating under pressure. If burst strength is required, there is employed a method which comprises using a bulked strand as a fibrous reinforcing substrate, adhering the other components thereto to prepare a preform yarn, charging it into a desired shape by spiral weaving or the like, preforming the charge, placing the preform in a mold or the like, then further preforming it, and molding the preform with heating under pressure. Another feasible method would be to cut the preform yarn to less than several centimeters, and then using the cut product as a molding material.

EXAMPLES

The present invention will be described in detail by reference to Examples, in which parts and % are on a weight basis unless otherwise indicated.

Example 1

Iron acetylacetonate (0.3 part) and dicumyl peroxide (0.5 part) were added as a catalyst system to 100 parts of a cyanate ester-maleimide resin (BT-2480, Mitsubishi Gas Chemical; a powder of 120 mesh). These materials were uniformly crushed and mixed in a ball mill to give a binder master batch.

An aromatic liquid crystal polyester resin (a resin with a melting start temperature of 310° C. made from p-hydroxybenzoic acid, hydroquinone, 2,6-naphthalenedicarboxylic acid, and N,N'-(4,4'-diphenyl ether)-bis-3,4-dicarboxyimidobenzoic acid) was subjected, in a non-melted condition, to a stepwise heat treatment (290° C./1 hour+310° C./30 min+330° C./30 min). Then, the heat-treated resin was ground by a wet mill, dehydrated, and dried to obtain a fibrillated pulp.

The following components were used to prepare a molding composition for a disk brake pad.

| Component | Proportion (parts) |
| --- | --- |
| Binder master batch | 20 |
| Fibrillated pulp of aromatic liquid crystal polyester resin | 10 |
| Rock wool fibers | 15 |
| Brass fibers | 15 |
| Barium sulfate | 20 |
| Graphite | 15 |
| BT resin dust*1 | 5 |

*1A powder of 20-100 mesh comprising a cured product of phenol modified xylene formaldehyde resin novolak-epoxy resin/BT resin (7:3)

The resulting molding composition was preformed at a surface pressure of 50 kgf/cm$^2$. The preform retained a desired shape during operations such as transfer and charging into the mold.

Separately, an iron plate was punched, then surface treated by sandblasting, and coated with an adhesive layer. The coated plate was placed in a mold, and the abovementioned preform was laid on the plate. The assembly was press molded for 10 minutes at a pressure of 200 kgf/cm$^2$ and a temperature of 175° C. The molded product was demolded, and then postcured (180° C./3 hr+270° C./4 hr) to obtain a disk brake pad.

The disk brake pad was tested for friction coefficient and wear. The results are shown in Tables 1 and 2.

Comparative Example 1

The procedure of Example 1 was repeated except that a fibrillated pulp of aramide fibers was used in place of the fibrillated pulp of the aromatic liquid crystal polyester resin.

The resulting disk brake pad was tested in the same manner as in Example 1. The results are shown in Tables 1 and 2.

Example 2

The procedure of Example 1 was repeated except that in place of the fibrillated pulp of the aromatic liquid crystal polyester resin, there was used an infusible fibrillated pulp prepared by melt-kneading 95 parts of the aromatic liquid crystal polyester resin of Example 1 and 5 parts of mesophase pitch (Maruzen Petrochemical Co., Ltd., SP-C, H/C=0.5 (atomic ratio)) at 325° C., grinding the system to produce a fibrillated pulp, and heating the fibrillated pulp stepwise from 280° to 400° C., with a temperature increment of 10° C. for each step and a time of 10 minutes taken for each step. The results are shown in Tables 1 and 2.

Comparative Example 2

The procedure of Example 1 was repeated except that a fibrillated pulp of an aromatic liquid crystal polyester resin with a melting start temperature of 280° C. (Vectra A-950, Hoechst Celanese Corp.) was used in place of the fibrillated pulp of the aromatic liquid crystal polyester resin. The results are shown in Tables 1 and 2.

Example 3

Iron acetylacetonate (0.3 part) and dicumyl peroxide (0.5 part) were added as a catalyst system to 100 parts of a cyanate ester-maleimide resin (BT-2480, Mitsubishi Gas Chemical; a powder of 120 mesh). Further, 20 parts of a phenol modified xylene-formaldehyde resin novolak-epoxy resin (TETRAD-G, Mitsubishi Gas Chemical) was added. These materials were uniformly crushed and mixed in a ball mill to give a binder master batch.

The resulting binder master batch and the following components were uniformly mixed to prepare a molding composition for a friction material.

| Component | Proportion (parts) |
| --- | --- |
| Binder master batch | 10 |
| Steel fibers | 50 |
| Copper fibers | 15 |
| Barium sulfate | 10 |
| Graphite | 10 |
| BT resin dust | 5 |

Furthermore, the following components were uniformly mixed to prepare a molding composition for a heat insulating layer.

| Component | Proportion (parts) |
| --- | --- |
| Binder master batch | 15 |
| Steel fibers | 25 |
| Copper fibers | 10 |
| Barium sulfate | 20 |
| Graphite | 10 |
| Fibrillated pulp of aromatic liquid crystal polyester resin*2 | 15 |
| BT resin dust*2 | 5 |

*2Same as in Example 1

A preforming mold was charged with 20 parts of the above molding composition for a heat insulating layer and 80 parts of the above molding composition for a friction material. Then, the charge was preformed at a surface pressure of 50 kgf/cm$^2$.

Separately, an iron plate was punched, then surface treated by sandblasting, and coated with an adhesive (a solution of a cyanate ester/maleimide resin adhesive composition, BT-A304, available from Mitsubishi Gas Chemical). The coating was dried to produce an iron plate with an adhesive layer.

The coated plate was placed in a mold, and the abovementioned preform was laid on the plate, with the heat insulating layer facing the adhesive layer. The assembly was press molded for 10 minutes at a temperature of 170° C. and a pressure of 200 kgf/cm$^2$. The molded product was demolded, and then postcured for 8 hours in an oven at 230° C. to obtain a semimetallic disk brake pad.

The resulting disk brake pad was tested for friction coefficient and wear. The results are shown in Tables 1 and 2.

The friction coefficient was measured by the testing method of the JIS D 4411.

An abrasion test for determining the wear was conducted in the following manner: A pad comprising the friction material for a brake was subjected to a braking test under the following conditions using a disk rotor set at a temperature of 550° C.:

| Moment of inertia | 5 kgf · m · sec$^2$ |
| --- | --- |
| Initial speed at braking | 160 km/H |
| Braking deceleration | 0.6 G |
| Number of brakings | 200 |

Then, the abrasion depth of the friction material was measured, and the pad was visually inspected.

TABLE 1

| | Friction coefficient ($\mu$) | | | | | After humidifying test(*1) | |
| --- | --- | --- | --- | --- | --- | --- | --- |
| Measuring temp. (°C.) | 100 | 150 | 200 | 250 | 300 | 100 | 200 |
| Ex. 1 | 0.42 | 0.43 | 0.42 | 0.41 | 0.40 | 0.38 | 0.33 |
| Ex. 2 | 0.41 | 0.41 | 0.40 | 0.40 | 0.39 | 0.37 | 0.33 |
| Comp. Ex. 1 | 0.43 | 0.42 | 0.40 | 0.40 | 0.39 | 0.33 | Blistered |
| Comp. Ex. 2 | 0.42 | 0.42 | 0.41 | 0.39 | 0.11–0.35*2 | 0.39 | 0.33 |
| Ex. 3 | 0.47 | 0.48 | 0.45 | 0.43 | 0.43 | 0.43 | 0.40 |

*1After being held for 48 hours at 40° C. and relative humidity of 95%.
*2A liquid substance partially occurs, causing variations in value.

TABLE 2

| | Abrasion depth (mm)*1 | Appearance of friction material after test |
| --- | --- | --- |
| Ex. 1 | 3.2 | No abnormality |
| Ex. 2 | 3.4 | " |
| Comp. Ex. 1 | 3.5 | " |
| Comp. Ex. 2 | 3.3 | *2 |
| Ex. 3 | 1.8 | No abnormality |

*1After abrasion test conducted at a disk temperature of 550° C.
*2Bleeding of a tarry substance.

Example 4

A strand with an apparent diameter of 3 mm comprising a bundle of silane coupling agent-treated E-glass monofilaments with a fiber diameter of 6 $\mu$m was dipped in a 15% methanol solution of a melamine modified phenolic resin. Then, the strand was dried for 1 hour at 120° C. to obtain a pre-impregnated strand.

NBR was dissolved in toluene, and a melamine modified phenolic resin was added, whereafter the mixture was made into a highly viscous solution with a viscosity of 10,000 to 20,000 cps. Then, a vulcanizing agent comprising sulfur, zinc oxide and a crosslinking accelerator (CZ), barium sulfate, carbon, and a fibrillated pulp of an aromatic liquid crystal polyester resin were kneaded and mixed.

The resulting mixture was adhered to the pre-impregnated strand prepared above, and brass fibers were wrapped about the strand, whereafter the assembly was thoroughly air-dried to form a preform yarn.

The resulting preform yarn was arranged in the form of a disk by spiral weaving, placed in a mold, and preformed under pressure. Then, the preform was molded for 10 minutes at a temperature of 150° C. and a surface pressure of 200 kgf/cm$^2$.

The resulting molded product was demolded, and heat-treated for 8 hours at 200° C. in a heating oven. Both frictional surfaces of the treated product were polished to obtain a disk-shaped clutch facing.

The resulting clutch facing was subjected to an abrasion test. The results are shown in Table 3.

The clutch facing contained the following components:

| Component | Proportion (parts) |
|---|---|
| Glass fibers | 40 |
| Brass fibers | 4 |
| Melamine modified phenolic resin | 12 |
| NBR | 14 |
| Vulcanizing agent | 6 |
| Barium sulfate | 8 |
| Graphite | 8 |
| Fibrillated pulp of aromatic liquid crystal polyester resin*2 | 8 |

*2Same as in Example 1

Comparative Example 3

The procedure of Example 3 was repeated except that a fibrillated pulp of an aramide resin was used instead of the fibrillated pulp of aromatic liquid crystal polyester resin. The results are shown in Table 3.

Example 5

A strand with an apparent diameter of 3 mm comprising a bundle of silane coupling agent-treated E-glass monofilaments with a fiber diameter of 6 μm and a fibrillated pulp of an aromatic liquid crystal polyester resin was bulked.

The bulky strand was dipped in a 10% methyl ethyl ketone solution of a cyanate ester-maleimide resin comprising 2,2-bis(4-cyanatophenyl)propane and N,N'-bis-maleimidophenylmethane (95:5) (hereinafter called BT-2060B), and then dried for 30 minutes at 120° C. to obtain a pre-impregnated strand.

Barium sulfate, carbon and BT resin dust were added to BT-2060B to prepare a highly viscous solution with a concentration of 80%. The resulting solution was adhered to the pre-impregnated strand prepared above, and the strand was dried for 15 minutes at 140° C. Brass fibers with a diameter of 0.2 mm were wrapped about the strand, whereafter the assembly was thoroughly air-dried to form a preform yarn with a diameter of about 4.0 mm.

The resulting preform yarn was arranged in the form of a disk by spiral weaving, placed in a mold, and preformed under pressure. Then, the preform was molded for 15 minutes at a temperature of 180° C. and a surface pressure of 200 kgf/cm$^2$.

The resulting molded product was demolded, and heat-treated stepwise (150° C./1 hr+240° C./6 hr) in a heating oven. Both frictional surfaces of the treated product were polished to obtain a disk-shaped clutch facing.

The clutch facing contained the following components:

| Component | Proportion (parts) |
|---|---|
| Glass fibers | 40 |
| Fibrillated pulp of aromatic liquid crystal polyester resin*2 | 6 |
| BT-2060B | 25 |
| Barium sulfate | 10 |
| Carbon | 10 |
| BT resin dust*2 | 5 |
| Brass fibers | 4 |

*2Same as in Example 1

The resulting clutch facing was subjected to an abrasion test. The results are shown in Table 3.

TABLE 3

| Measuring temp. (°C.) | Friction coefficient (μ) | | | | | | Wear rate*2 |
|---|---|---|---|---|---|---|---|
| | | | | | After humidifying test*1 | | |
| | 50 | 100 | 200 | 300 | 100 | 200 | 300 |
| Ex. 4 | 0.41 | 0.42 | 0.37 | 0.28 | 0.36 | 0.34 | 8.3 |
| Comp. Ex. 3 | 0.43 | 0.41 | 0.34 | 0.20 | 0.39 | Blistered | 10.1 |
| Ex. 5 | 0.45 | 0.44 | 0.42 | 0.39 | 0.40 | 0.39 | 1.7 |

*1After being held for 48 hours at 40° C. and relative humidity of 95%
*2× $10^{-7}$ cm$^3$ kgf$^{-1}$ m$^{-1}$ As will be obvious from the above detailed description of the invention and the Examples, the friction material of the present invention uses a fibrillated pulp of an aromatic liquid crystal polyester resin. It is thus excellent in affinity for the binder resin, heat resistance and other properties, has low water absorption, is minimal in abnormalities, including blister formation due to moisture absorption associated with heat during temperature rise. It also has excellent preform-retaining properties. Hence, it is of paramount industrial significance.

What is claimed is:

1. A friction material comprising fibrous reinforcing substrate other than asbestos, selected from the group consisting of organic fibrous reinforcing substrate and mixtures of organic fibrous reinforcing substrate and inorganic fibrous reinforcing substrate, a binder and a friction wear regulator wherein said organic fibrous reinforcing substrate comprises a fibrillated pulp of an aromatic liquid crystal polyester resin as a main component, said fibrillated pulp having a melting point of 330° C. or higher.

2. The friction material of claim 1 wherein the fibrillated pulp is of a shape in which numerous branch fibers with a diameter of 0.1 to 10 μm are branched from trunk fibers with a length of 0.5 to 5 mm and a diameter of 5 to 50 μm.

3. The friction material of claim 1 wherein the amount of said fibrillated pulp used is 70–100% by weight of said organic fibrous reinforcing substrate.

4. The friction material of claim 1 wherein the fibrillated pulp of the aromatic liquid crystal polyester resin has a melting start temperature raised by heat treatment.

5. The friction material of claim 1 wherein the fibrillated pulp of the aromatic liquid crystal polyester resin is rendered infusible.

6. The friction material of claim 5 wherein the fibrillated pulp comprises fibers produced by heat-treating a composition comprising the aromatic liquid crystal polyester resin and 2 to 10% by weight of pitch having a hydrogen atom/carbon atom ratio of from 0.4 to 0.9 to render the aromatic liquid crystal polyester resin infusible.

* * * * *